US008848572B2

(12) United States Patent
Deng et al.

(10) Patent No.: US 8,848,572 B2
(45) Date of Patent: Sep. 30, 2014

(54) MODEM AND NETWORK SEARCH METHOD OF MODEM

(71) Applicant: Huawei Device Co., Ltd., Guangdong (CN)

(72) Inventors: Yu Deng, Shanghai (CN); Konggang Wei, Shenzhen (CN)

(73) Assignee: Huawei Device Co., Ltd, Shenzhen (CN)

( * ) Notice: Subject to any disclaimer, the term of this patent is extended or adjusted under 35 U.S.C. 154(b) by 0 days.

(21) Appl. No.: 14/095,981

(22) Filed: Dec. 3, 2013

(65) Prior Publication Data
US 2014/0092768 A1 Apr. 3, 2014

Related U.S. Application Data

(63) Continuation of application No. PCT/CN2012/081227, filed on Sep. 11, 2012.

(30) Foreign Application Priority Data

Jan. 21, 2012 (CN) .......................... 2012 1 0019865

(51) Int. Cl.
H04J 1/16 (2006.01)
H04J 3/14 (2006.01)
H04L 1/00 (2006.01)
H04L 12/26 (2006.01)
H04L 12/28 (2006.01)

(52) U.S. Cl.
USPC ........................................ 370/252; 370/254

(58) Field of Classification Search
CPC ......... H04L 47/10; H04L 43/50; H04L 41/12; H04L 45/02
USPC .................................................. 370/252, 254
See application file for complete search history.

(56) References Cited

U.S. PATENT DOCUMENTS 4,556,760 A 12/1985 Goldman
8,089,939 B1 1/2012 Mater et al.
(Continued)

FOREIGN PATENT DOCUMENTS

CN 102056211 A 5/2011
CN 102098715 A 6/2011
CN 102547941 A 7/2012

OTHER PUBLICATIONS

3GPP TS 25.304; V10.1.0; 3rd Generation Partnership Project; Technical Specification Group Radio Access Network; User Equipment (UE) procedures in idle mode and procedures for cell reselection in connected mode; (Release 10); Jun. 2011; total 52 pages.

(Continued)

Primary Examiner — Ronald Abelson
(74) Attorney, Agent, or Firm — Huawei Device Co., Ltd

(57) ABSTRACT

The present application provides a modem and a network search method of the modem. The method includes: sampling a signal level value and a signal quality value of a serving cell; obtaining a signal power condition according to the signal level value, and obtaining a signal stability condition according to the signal quality value; and when both the signal power condition and the signal stability condition are higher than set conditions, determining a network search state as an off state. In embodiments of the present application, power consumption and a workload may be reduced.

10 Claims, 4 Drawing Sheets

(56) References Cited

U.S. PATENT DOCUMENTS

2010/0240371 A1    9/2010  Cook et al.
2010/0267385 A1*  10/2010  Iwamura et al. ........... 455/435.2
2010/0279638 A1*  11/2010  Lindoff ...................... 455/226.1

OTHER PUBLICATIONS

3GPP TS 25.304 V10.3.0, 3rd Generation Partnership Project; Technical Specification Group Radio Access Network; User Equipment (UE) procedures in idle mode and procedures for cell reselection in connected mode (Release 10), dated Dec. 2011, total 52 pages.

* cited by examiner

MODEM AND NETWORK SEARCH METHOD OF MODEM

CROSS-REFERENCE TO RELATED APPLICATIONS

This application is a continuation of International Application No. PCT/CN2012/081227, filed on Sep. 11, 2012, which claims priority to Chinese Patent Application No. 201210019865.3, filed on Jan. 21, 2012, both of which are hereby incorporated by reference in their entireties.

TECHNICAL FIELD

The present application relates to the field of mobile communication technologies, and in particular, to a modem and a network search method of the modem.

BACKGROUND

A modem is a conversion interface that enables digital data being transmitted on an analog signal transmission line. A mobile communication modem is a part of a mobile communication device such as a mobile phone or a data card. A mobile communication modem device is a device that includes a mobile communication modem, examples of which include mobile phones, mobile broadband data cards, and tablet computers equipped with third generation (3G) communication capabilities.

Conventionally, a mobile communication modem or a mobile communication modem device (collectively referred to as "modem" hereinafter) is capable of searching for a network in a standby state. In network searching strategies, an S criterion and an R criterion are used. The S criterion is used to control a start strategy, whereas the R criterion is used to filter a neighboring cell, so as to switch a serving cell from a current serving cell to a filtered neighboring cell. In applying the S criterion, the signal quality and signal power of a current serving cell where the modem camps on need to be detected in order to obtain a signal quality factor and a signal power factor of the serving cell. A filtering is started when either of the two reaches a threshold value. The R criterion may be used in the filtering, and with the R criterion applied, a neighboring cell is selected according to measured signal quality values of a plurality of neighboring cells. In order to obtain a neighboring cell through reselection immediately when signal strength of the serving cell declines, related operations such as signal quality measurement and signal power measurement need to be performed on the serving cell and the neighboring cells at the same time. Herein, a serving cell refers to a cell with which a modem is having a connection with, and user information is sent from the cell. Neighboring cells refer to two cells with overlapping coverage and between which a switching relationship exists. One cell may have a plurality of neighboring cells. Network search means to search for a mobile communication network according to strength and quality of wireless signals.

However, in the existing technology, a data source for applying the S criterion thereon is an instantaneous value of a network signal, and momentary signal weakening caused by network signal fluctuation, which does not affect normal standby of a modem, would affect a calculation result using the S criterion. Once the calculation result reaches a threshold value, a network search measurement is started. In the network search measurement, searching for a neighboring cell needs to be performed, and much electricity is consumed during the search for the neighboring cell. Especially, in the case of many neighboring cells, workload of the modem is greatly increased.

SUMMARY

The present application provides a modem and a network search method of the modem, so as to reduce power consumption and workload of the modem.

The network search method performed by the modem includes:

periodically sampling signals of a serving cell so as to obtain one or more signal level values and signal quality values of the serving cell;

determining a signal power condition according to the signal level values, and determining a signal stability condition according to the signal quality values; and when both the signal power condition and the signal stability condition are better than their respective preset condition thresholds, setting a network search state of the modem as an off state, The network search state of the modem includes an off state and a start state, when the modem is in the off state, the network search is not performed by the modem.

Accordingly, the modem being served by a cellular communication network includes:

a signal sampling unit, configured to periodically sample signals of a serving cell so as to obtain one or more signal level values and signal quality values of the serving cell;

a data storage and operation unit, configured to determine a signal power condition according to the signal level values, and determine a signal stability condition according to the signal quality values; and a determining unit, configured to, when both the signal power condition and the signal stability condition are better than their respective preset condition thresholds, set a network search state of the modem as an off state, The network search state of the modem includes an off state and a start state, when the modem is in the off state, the network search is not performed by the modem.

It can be known from the foregoing technical solutions that, in the embodiments of the present application, a signal of a serving cell is sampled, a signal power condition of the serving cell is obtained according to a sampled signal level, a signal stability condition of the serving cell is obtained according to a sampled signal quality, and when both the signal power condition and the signal stability condition are better than their respective preset conditions, network search is turned off, so that unnecessary network search may be avoided, thereby reducing power consumption and workload of a modem.

BRIEF DESCRIPTION OF THE DRAWINGS

To describe the technical solutions in the embodiments of the present application more clearly, the accompanying drawings for describing the embodiments are introduced briefly in the following. Apparently, the accompanying drawings in the following description show some embodiments of the present application, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present application more comprehensible, the technical solutions in the embodiments of the present application are described in the following clearly with reference to the accompanying drawings in the embodiments of the present application. Apparently, the embodiments to be described are merely a part rather than all of the embodiments of the present application. All other embodiments obtained by persons of ordinary skill in the art based on the embodiment of the present application without creative efforts shall fall within the protection scope of the present application.

Figure 1:
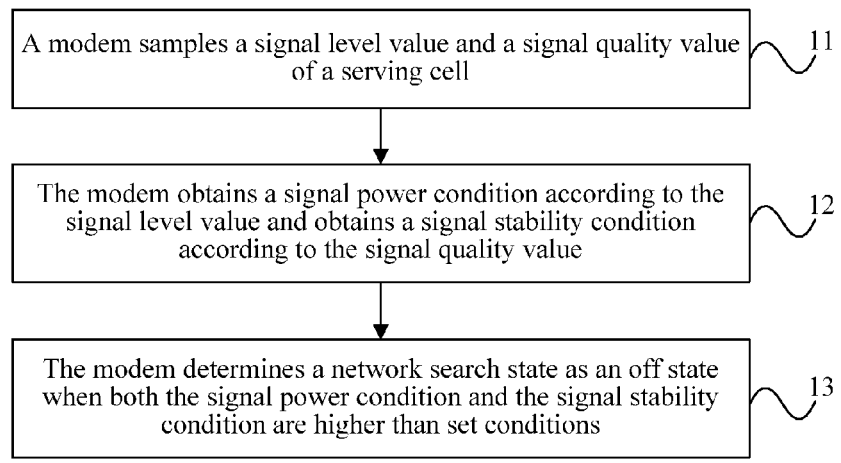
FIG. 1 is a flow chart of a network search method of a modem according to an embodiment of the present application.

FIG. 1 is a flow chart of a network search method of a modem according to an embodiment of the present application. The method includes the following steps:

Step 11: A modem monitors signal level and signal quality of a serving cell by way of periodically sampling.

As mentioned above, the word "modem" refers collectively to a mobile communication modem or a mobile communication modem device.

The signal level, which indicates the strength of a received signal, is represented by a signal level value $rx_n$; and the signal quality, which indicates the quality, i.e. purity, of a received signal, is represented by a signal quality value $q_n$. When a received signal is strong but also contains many noises, the signal level value of it is large but the signal quality value of it may be small.

Step 12: The modem obtains a signal power condition according to the signal level value, and obtains a signal stability condition according to the signal quality value.

Quantitatively, the signal power condition may be represented by a mean value of signal level values, and the signal stability condition may be represented by a variance of signal quality values.

Step 13: When both the signal power condition and the signal stability condition are better than their respective preset conditions, a network search state of the modem is set as an off state.

A first threshold value and a second threshold value may be set, respectively. When a value of the signal power condition is higher than the set first threshold value, and a value of the signal stability condition is higher than the set second threshold value, a network search state of the modem is determined as an off state. The network search algorithm, namely, an S algorithm and an R algorithm ceases to be executed.

In this embodiment, a signal of a serving cell is sampled, a signal power condition is obtained according to a sampled signal level value, and a signal stability condition is obtained according to a signal quality value. When a value of the signal power condition is higher than a set value, it may indicate that the signal strength of a serving cell satisfies a set requirement, and therefore, when a value of the signal stability condition is higher than a set value, it may indicate that the signal strength of the serving cell is better; and when the value of the signal power condition is higher than the set value, it may indicate that the stability of the serving cell satisfies a set requirement, and therefore, when the value of the signal stability condition is higher than the set value, it may indicate that the signal stability of the serving cell is better. In this embodiment, when the signal strength and the stability of the serving cell are better, namely, when both the value of the signal power condition and the value of the signal stability condition are higher than the set values, network search is turned off, so that unnecessary network search may be avoided, thereby reducing power consumption and a workload.

Figure 2:
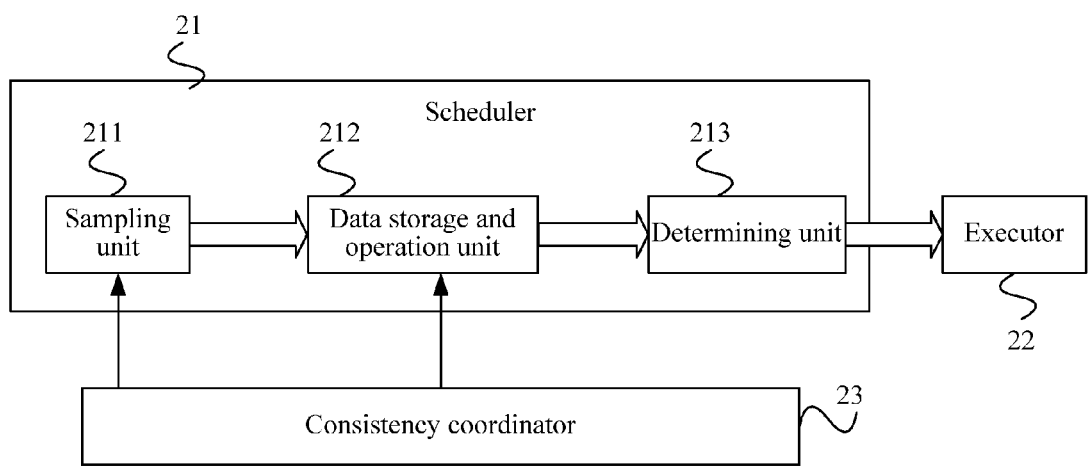
FIG. 2 is a simplified block diagram of a modem according to the present application.

This embodiment of the present application may specifically be implemented by adopting a principle of an inference engine. Inference is a process of deducing a conclusion from known facts according to a certain rule. A knowledge-based inference engine can be implemented in by a computer program which mainly includes two parts: inference and control. As shown in FIG. 2, the inference engine includes a scheduler 21, an executor 22, and a consistency coordinator 23. The scheduler 21 may include a sampling unit 211, a data storage and operation unit 212, and a determining unit 213. The sampling unit 211 is configured to sample a signal level value and a signal quality value of a serving cell; the data storage and operation unit 212 is configured to obtain a signal power condition and a signal stability condition according to the signal level value and the signal quality value. The determining unit 213 is configured to, when both the signal power condition and the signal stability condition are higher than their respective preset conditions, determine a network search state as an off state. The executor 22 is configured to, when the network search state is an off state, turn off an S algorithm and an R algorithm, and when network search is started, start the S algorithm and the R algorithm to perform network search. The executor 22 may be configured to execute a specific S algorithm and a specific R algorithm. The consistency coordinator 23 is configured to correct operating parameters of the executor 22 and the scheduler 21, for example, correct a sampling period of the sampling unit 211 in the scheduler 21, the size of data storage space, and feedback on a result of the executor 22 (correct the foregoing parameters).

Figure 3:
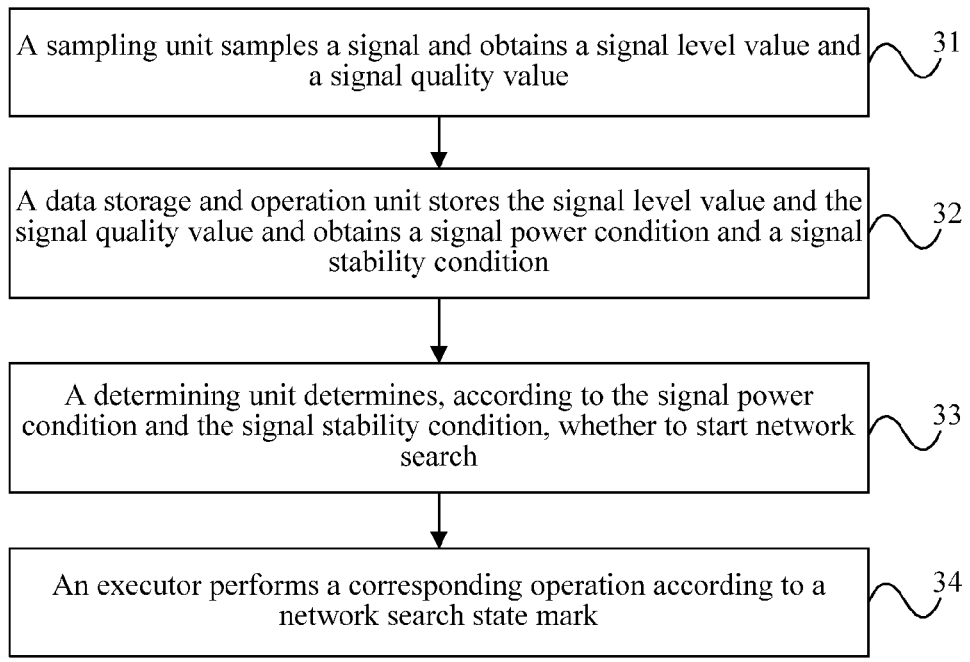
FIG. 3 is a flow chart of a network search method of a modem according to another embodiment of the present application.

FIG. 3 is a flow chart of a network search method of a modem according to another embodiment of the present application, where the method includes:

Step 31: A sampling unit samples a signal and obtains a signal level value and a signal quality value.

Step 32: A data storage and operation unit stores the signal level value and the signal quality value and obtains a signal power condition and a signal stability condition.

Figure 4:
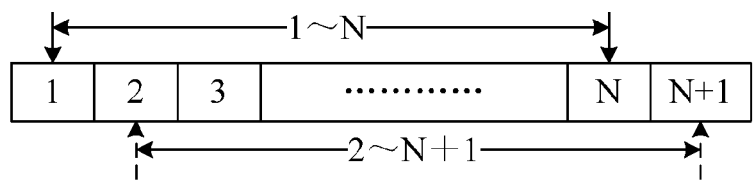
FIG. 4 is a schematic diagram of storing sampled data according to the present application.

In this embodiment, data may be stored and updated in a sliding window manner. As shown in FIG. 4, it is assumed that an adopted window is N, so that N pieces of data numbered as 1 to N from old to new are stored in a data buffer according to a sampling history. When an $(N+1)^{th}$ piece of data arrives, a first and the oldest piece of data is deleted, so that in the storage space in a system, data is always the newest.

It is assumed that a signal level value of an $n^{th}$ newest signal sample is $rx_n$, where $n=1, \ldots, N$, and a quality value of the $n^{th}$ newest signal sample is $q_n$, $n=1, \ldots, N$. A signal power condition and a signal stability condition may be obtained through calculation by adopting the following formulas:

The signal power condition is represented by $R_{avg}$:

$$R_{avg} = \frac{\sum_{n=1}^{N} rx_n}{N};$$

and
the signal stability condition is represented by $Q_{var}$:

$$Q_{var} = \frac{\sum_{n=1}^{N} |q_n - Q_{avg}|}{N},$$

where $$Q_{avg} = \frac{\sum_{n=1}^{N} q_n}{N}.$$

Step 33: A determining unit determines, according to the signal power condition and the signal stability condition, whether to start network search.

If the signal power condition $R_{avg}$ is higher than a preset first threshold value and the signal stability condition $Q_{var}$ is higher than a preset second threshold value, turn off network search. Specific values of the first threshold and the second threshold may be set according to a practical situation.

After the determining unit determines that the network search is turned off, a network search state mark may be set to "forbid", or otherwise, an original network search state mark is kept unchanged.

Step 34: An executor performs a corresponding operation according to the network search state mark.

For example, when the network search state mark is "forbid", the executor turns off an S algorithm and an R algorithm, so as to avoid unnecessary network search, measurement and cell reselection.

In addition, when the network search state mark is "start", the S algorithm and the R algorithm are executed, and network search may be performed.

In this embodiment, according to historical data, namely, a signal quality value and a signal level value, a network state of a serving cell is inferred, so as to further prevent network search from starting due to an accidental factor and reduce unnecessary cell reselection.

Further, when a large-scale disturbance occurs in a network or a user in a moving state is about to leave the current serving cell, a network search algorithm needs to be rapidly started.

Figure 5:
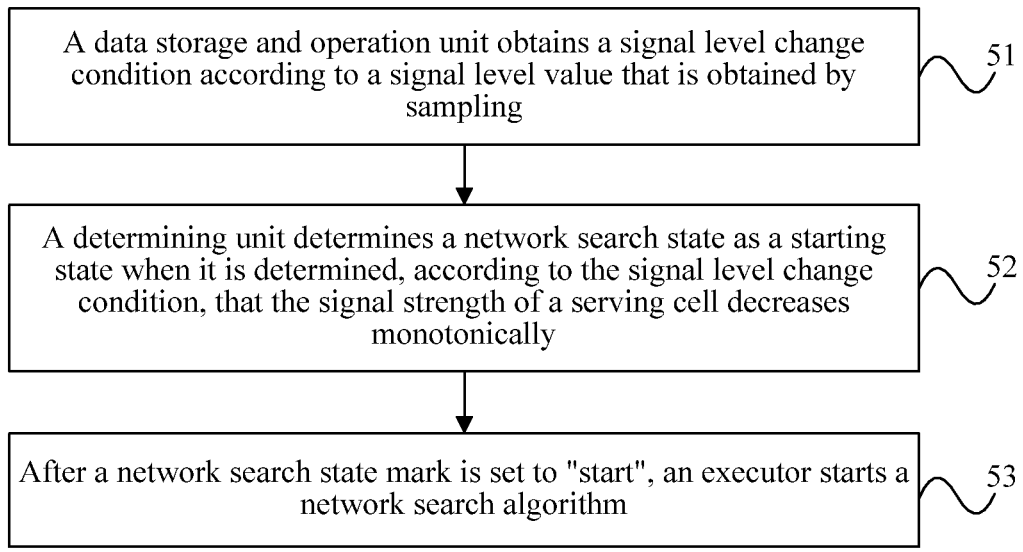
FIG. 5 is a flow chart of a network search method of a modem according to another embodiment of the present application.

FIG. 5 is a flow chart of a network search method of a modem according to another embodiment of the present application, where the method includes:

Step 51: A data storage and operation unit obtains a signal level change condition according to a signal level value obtained by sampling.

The signal level change condition may be represented by a value $Rx'_n$, and a calculation formula of which is:

$$Rx'_n = \frac{d rx_{n+1}}{d t_{n+1}}$$
$$= \frac{rx_{n+1} - rx_n}{\Delta t}$$

Step 52: A determining unit determines a network search state as a starting state when it is determined, according to the signal level change condition, that the signal strength of a serving cell decreases monotonically.

There are N signal level values in the storage space, and therefore, (N−1) signal level change conditions may be obtained according to the foregoing calculation formula. If a large part, for example, 70% of these (N−1) signal level change conditions are smaller than 0, that is, it indicates that the signal quality of the serving cell is in a monotonically decreasing trend, a network search state mark is set to "start".

Step 53: After the network search state mark is set to "start", an executor starts a network search algorithm.

After it is determined that the network search state mark is "start", the executor may start an S algorithm and an R algorithm immediately, and perform network search and measurement by using the S algorithm and perform cell reselection by using the R algorithm.

Specifically, an S criterion is used to control a start policy, and its algorithm is as follows:

$$S_{qual} = Q_{qualmeas} - Q_{qualmin} \quad (1)$$

$$S_{relev} = Q_{rxlevmeas} - Q_{rxlevmin} - P_{compensation} \quad (2)$$

where:
$S_{qual}$ signal quality factor
$S_{relev}$ signal power factor
$Q_{qualmeas}$ measured signal quality value
$Q_{rxlevmeas}$ measured signal reception power consumption value
$Q_{qualmin}$ minimum receivable signal quality
$Q_{rlxevim}$ minimum receivable power value
$P_{compensation}$ max (UE_TXPWR_MAX_RACH-P_MAX, 0)

UE_TXPWR_MAX_RACH is permitted maximum transmission power when a modem performs random access, which is sent by a system broadcast message and generally set to 0; and P_MAX is maximum nominal transmission power of the modem. $P_{compensation}$ takes the larger of the difference between UE_TXPWR_MAX_RACH and P_MAX, and 0.

The signal quality factor $S_{qual}$ is obtained through calculation according to formula (1), the signal power factor $S_{relev}$ is obtained through calculation according to formula (2), and when either value of the two reaches an intra-frequency, inter-frequency, or inter-system measurement threshold, the modem starts network search measurement in a corresponding range, and then filter measurement results by adopting an R criterion. An algorithm of the R criterion is as follows:

$$R_s = Q_{meas\_s} + Q_{hysts} \quad (3)$$

$$R_n = Q_{meas\_n} - Q_{offsets\_n} \quad (4)$$

where:
$R_s$ signal quality factor of a current serving cell
$R_n$ signal quality factor of an $n^{th}$ neighboring cell
$Q_{meas\_s}$ measured signal quality value of the serving cell
$Q_{meas\_n}$ measured signal quality value of the $n^{th}$ neighboring cell
$Q_{hysts}$ reselection hysteresis of the serving cell
$Q_{offsets\_n}$ signal quality offset of the $n^{th}$ neighboring cell The modem calculates values of $R_s$ and $R_n$ according to formulas (3) and (4), and when $R_s < R_n$ is maintained over a certain period of time, starts cell reselection, and re-selects a certain neighboring cell n from a serving cell s.

In this embodiment, after it is determined that the signal strength of a serving cell decreases, a network search algorithm may be started in time, and cell reselection may be implemented in time.

Figure 6:
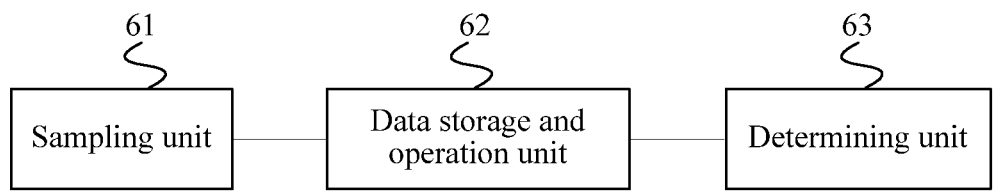
FIG. 6 is a simplified block diagram of a modem according to an embodiment of the present application.

FIG. 6 is a simplified block diagram of a modem according to an embodiment of the present application, where the modem includes a sampling unit 61, a data storage and operation unit 62, and a determining unit 63. The sampling unit 61 is configured to sample a signal level value and a signal quality value of a serving cell. The data storage and operation unit 62 is configured to obtain a signal power condition according to the signal level value, and obtain a signal stability condition according to the signal quality value. The determining unit 63 is configured to, when both the signal power condition and the signal stability condition are higher than their respective preset conditions, determine a network search state as an off state.

Optionally, the data storage and operation unit 62 is further configured to obtain a signal level change condition according to the signal level value. The determining unit 63 is further configured to determine, according to the signal level change condition, whether the signal strength of the serving cell decreases monotonically, and when it is determined, according to the signal level change condition, that the signal strength of the serving cell decreases monotonically, determine a network search state as a start state.

Optionally, the data storage and operation unit 62 is specifically configured to:
obtain the signal power condition through calculation according to the following formula:

$$R_{avg} = \frac{\sum_{n=1}^{N} rx_n}{N} \quad (5)$$

where $R_{avg}$ is a value of the signal power condition, $rx_n$ is the signal level value, and $n=1, \ldots, N$, where N is the number of signal level values.

Optionally, the data storage and operation unit is specifically configured to:
obtain the signal stability condition through calculation according to the following formula:

$$Q_{var} = \frac{\sum_{n=1}^{N} |q_n - Q_{avg}|}{N} \quad (6)$$

where $$Q_{avg} = \frac{\sum_{n=1}^{N} q_n}{N}$$

$Q_{var}$ is a value of the signal stability condition, $q_n$ is the signal quality value, and $n=1, \ldots, N$, and N is the number of signal quality values.

Optionally, the data storage and operation unit 62 is specifically configured to:
obtain the signal level change condition through calculation according to the following formula:

$$Rx'_n = \frac{rx_{n+1} - rx_n}{\Delta t} \quad (7)$$

where $Rx'_n$ is a value of the signal level change condition, $rx_n$ and $rx_{n+1}$ are signal level values that are obtained after sampling is performed consecutively twice, and $\Delta t$ is a sampling time interval.

Optionally, the determining unit 63 is specifically configured to, when the number of values of the signal level change condition, which are smaller than 0, is greater than a set threshold value, determine that the signal strength of the serving cell decreases monotonically.

In this embodiment, a signal of a serving cell is sampled, a signal power condition is obtained according to a sampled signal level value, a signal stability condition is obtained according to a signal quality value, and when both the signal power condition and the signal stability condition are higher than set conditions, namely, when the signal strength and the stability of the serving cell are better, network search is turned off, so that unnecessary network search may be avoided, thereby reducing power consumption and a workload.

Figure 7:
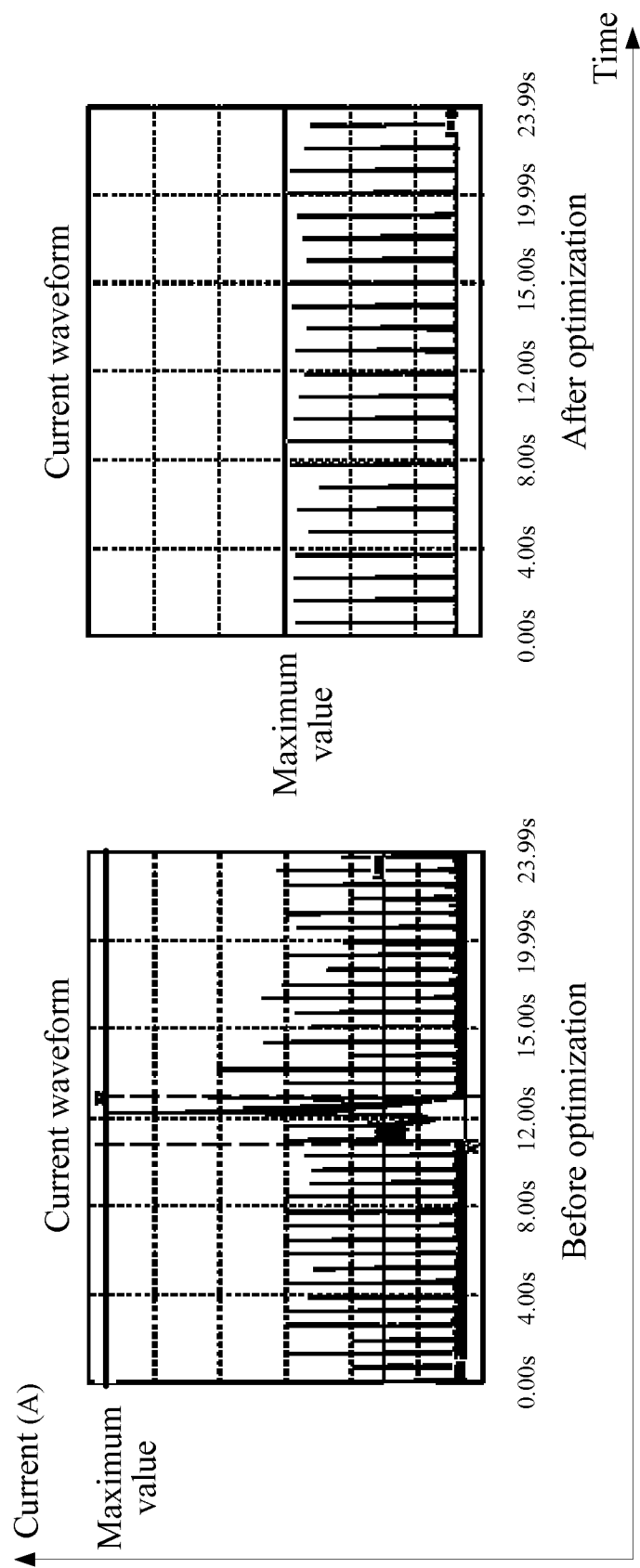
FIG. 7 is a comparison of simulation results between the prior art and the present application.

According to the foregoing embodiments, in the present application, standby power consumption may be reduced. For a specific simulation diagram, reference may be made to FIG. 7. The "before optimization" in FIG. 7 indicates a power consumption condition in the prior art, and the "after optimization" indicates a power consumption condition in the embodiment of the present application. It can be seen from FIG. 7 that a maximum value of a current after the optimization is smaller than that before the optimization, and, after the optimization, the number of pulses is apparently decreased and power consumption is reduced.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk, or an optical disk.

Finally, it should be noted that the foregoing embodiments are merely intended for describing the technical solutions of the present application rather than limiting the present application. Although the present application is described in detail with reference to the foregoing embodiments, persons of ordinary skill in the art should understood that they may still make modifications to the technical solutions described in the foregoing embodiments, or make equivalent replacements to some technical features of the technical solutions, as long as these modifications or replacements do not cause the essence of corresponding technical solutions to depart from the scope of the technical solutions in the embodiments of the present application.

What is claimed is:

1. A network search method performed by a modem, comprising:
periodically sampling signals of a serving cell so as to obtain at least two signal level values and at least two signal quality values of the serving cell;
determining a signal power condition according to the signal level values, and determining a signal stability condition according to the signal quality values;
when both the signal power condition and the signal stability condition are better than their respective preset condition thresholds, setting a network search state of the modem as an off state, wherein the network search state of the modem includes an off state and a start state, when the modem is in the off state, a network search operation is not performed by the modem;
determining a signal level change condition according to the signal level values;
determining, according to the signal level change condition, whether signal strength of the serving cell decreases monotonically; and when it is determined that the signal strength of the serving cell decreases monotonically, setting the network search state of the modem as the start state, wherein when the modem is in the start state, the network search operation is performed for reselecting another serving cell.

2. The method according to claim 1, wherein determining a signal power condition according to the signal level values comprises:

calculating the signal power condition according to the following formula:

$$R_{avg} = \frac{\sum_{n=1}^{N} rx_n}{N}$$

wherein $R_{avg}$ is a value of the signal power condition, $rx_n$ is the $n^{th}$ signal level value, $n=1, \ldots, N$, and N is the number of signal level values.

3. The method according to claim 1, wherein determining the signal stability condition according to the signal quality values comprises:

calculating the signal stability condition according to the following formula:

$$Q_{var} = \frac{\sum_{n=1}^{N} |q_n - Q_{avg}|}{N}$$

wherein $$Q_{avg} = \frac{\sum_{n=1}^{N} q_n}{N},$$

$Q_{var}$ is a value of the signal stability condition, $q_n$ is the $n^{th}$ signal quality value, $n=1, \ldots, N$, and N is the number of signal quality values.

4. The method according to claim 1, wherein the signal level change condition is calculated according to the following formula:

$$Rx'_n = \frac{rx_{n+1} - rx_n}{\Delta t}$$

wherein $Rx'_n$ is the $n^{th}$ value of the signal level change condition, $rx_n$ and $rx_{n+1}$ are $n^{th}$ and $(n+1)^{th}$ signal level values obtained through the periodic sampling, and $\Delta t$ is a sampling time interval.

5. The method according to claim 4, wherein the determining, according to the signal level change condition, whether the signal strength of the serving cell decreases monotonically comprises:

if the calculated value of the signal level change condition is repeatedly smaller than 0 for a number greater than a set threshold, determining that the signal strength of the serving cell decreases monotonically.

6. A modem capable of being served by a cellular communication network, comprising:

a signal sampling unit, configured to periodically sample signals of a serving cell periodically so as to obtain at least two signal level values and at least two signal quality values of the serving cell;

a determining unit, configured to determine a signal power condition according to the signal level values, and a signal stability condition according to the signal quality values; and a state setting unit, configured to, when both the signal power condition and the signal stability condition are better than their respective preset condition thresholds, set a network search state of the modem as an off state, wherein the network search state of the modem includes an off state and a start state, when the modem is in the off state, a network search operation is not performed by the modem, wherein the determining unit is further configured to determine a signal level change condition according to the signal level values; and, according to the signal level change condition, determine whether signal strength of the serving cell decreases monotonically; and the state setting unit is further configured to, when it is determined that the signal strength of the serving cell decreases monotonically, set the network search state of the modem as the start state, wherein when the modem is in the start state, the network search operation is performed by the modem for reselecting another serving cell.

7. The modem according to claim 6, wherein the determining unit is configured to:

determine the signal power condition according to the following formula:

$$R_{avg} = \frac{\sum_{n=1}^{N} rx_n}{N}$$

wherein $R_{avg}$ is a value of the signal power condition, $rx_n$ is the $n^{th}$ signal level value, $n=1, \ldots, N$, and N is the number of signal level values.

8. The modem according to claim 6, wherein the determining unit is configured to:

determine the signal stability condition according to the following formula:

$$Q_{var} = \frac{\sum_{n=1}^{N} |q_n - Q_{avg}|}{N}$$

wherein $$Q_{avg} = \frac{\sum_{n=1}^{N} q_n}{N},$$

$Q_{var}$ is a value of the signal stability condition, $q_n$ is the $n^{th}$ signal quality value, $n=1, \ldots, N$, and N is the number of signal quality values.

9. The modem according to claim 6, wherein the determining unit is configured to:
    calculate the signal level change condition according to the following formula:

$$Rx'_n = \frac{rx_{n+1} - rx_n}{\Delta t}$$

wherein $Rx'_n$ is the $n^{th}$ value of the signal level change condition, $rx_n$ and $rx_{n+1}$ are $n^{th}$ and $(n+1)^{th}$ signal level values obtained through the periodic sampling, and $\Delta t$ is a sampling time interval.

10. The modem according to claim 9, wherein the determining unit is configured to, when the calculated value of the signal level change condition is repeatedly smaller than 0 for a number greater than a set threshold, determine that the signal strength of the serving cell decreases monotonically.

* * * * *